(12) United States Patent
Tresser et al.

(10) Patent No.: US 6,990,586 B1
(45) Date of Patent: Jan. 24, 2006

(54) SECURE DATA TRANSMISSION FROM UNSECURED INPUT ENVIRONMENTS

(75) Inventors: Charles P. Tresser, Mamaroneck, NY (US); Wlodek W. Zadrozny, Tarrytown, NY (US)

(73) Assignee: International Business Machines Corp., Armonk, NY (US)

( * ) Notice: Subject to any disclaimer, the term of this patent is extended or adjusted under 35 U.S.C. 154(b) by 1398 days.

(21) Appl. No.: 09/585,752

(22) Filed: Jun. 2, 2000

(51) Int. Cl.
*G06F 1/26* (2006.01)

(52) U.S. Cl. ............... 713/182; 713/168; 713/189; 713/200; 713/201

(58) Field of Classification Search ........... 713/182, 713/168, 189, 200, 201
See application file for complete search history.

(56) References Cited

U.S. PATENT DOCUMENTS 5,971,272 A    10/1999    Hsiao

*Primary Examiner*—Thomas R. Peeso
(74) *Attorney, Agent, or Firm*—Law Office of Charles W. Peterson, Jr.; Louis J. Percello; Satheesh K. Karra

(57) ABSTRACT

An apparatus, business method and program product for selectively providing access to a service facility such as a financial institution or bank. Client access codes (passwords, PINs) are maintained by the service facility in a database. When a client seeks access to the service facility, e.g., access to the client's account, a random sequence of character is generated and passed to the client. The client responds with an offset that when combined with the random character sequence is the client's access code. The client sends the code to the service facility and is granted access to the client's account. Optionally, the service facility may specify an intended relationship between the offset and the random character sequence, e.g., the offset is added/subtracted from the random character sequence. For additional security, dummy characters may be embedded in the random character sequence.

19 Claims, 2 Drawing Sheets

SECURE DATA TRANSMISSION FROM UNSECURED INPUT ENVIRONMENTS

BACKGROUND OF THE INVENTION

1. Field of the Invention

The present invention related generally to secure data entry and more particularly to keying in passwords or other important secure information in unsecured spaces where the data entry actions are visible or otherwise capturable by eavesdropping or other means.

2. Background Description

Currently, there is an explosion of pervasive computing. Small hand held devices can now support sophisticated computational power, in particular, sufficient to handle cryptographic functions. Porting such capabilities to wireless communication system, such as in a smart phone, may enable secure voice and data communications and, in particular, allow performance of routine business transactions (such as stock trades) and online payment. To complement typical telephony the Bluetooth wireless technology standard has been promulgated, for example, to promote development of small-form factor, low-cost, short range radio links between mobile PCs, mobile phones and other portable devices. A smart phone typically contains one or more smart cards, such as a (Subscriber Identification Module) SIM card. If properly equipped with a secure identification function, a SIM card may be identified securely during a communication.

However, portable smart phones may be stolen. So, it is also important to ensure during transactions that the smart phone is being used is by its owner or another legitimate user. To that effect, one may use Personal Identification Numbers (PINs), also referred to as passwords, especially to protect charge cards and credit cards from unauthorized use. Biometrics also have been used for this purpose.

Typically, a PIN is keyed into a terminal keypad. A password may be spoken, e.g., "your mother's maiden name," or entered using speech recognition software, if such a feature is available. Often, PIN entry is performed in open, non-secure public places, e.g., an Automated Teller Machine (ATM) in a grocery store or a public telephone booth at an airport. Also, the PIN may be entered at a computer terminal in the workplace, where other people have access to the computer. Depending upon the level of security of the location or the particular point of PIN entry, an unscrupulous person spying on the person entering the PIN, may steal it.

Frequently, stories appear in the newspapers about PIN thieves, waiting with binoculars at airports, watching people on public phones as they key in credit card information and corresponding PINs which are then sold and widely distributed to other dishonest people. Spoken passwords can be stolen by a lip reader observing the speaker, by a surreptitiously placed microphone or, by someone just within hearing range of the speaker. An unscrupulous person may even use these techniques to defeat biometric security systems. Also, there have been cases reported of false ATMs placed solely for the purpose of stealing PINs.

Once these stolen passwords and/or PINs are in the possession of a dishonest person, if the possessor also steals the smart phone or credit card the possessor may make fraudulent purchases that are charged to that account. If the password thief calls a bank pretending to be the rightful owner of an account and provides the owner's mother's maiden name the thief can empty the account.

Approaches are being developed to reduce this exposure to eavesdroppers. One such approach is provided in U.S. Pat. No. 5,774,525, entitled "Method and apparatus utilizing dynamic questioning to provide secure access control" to Kanevsky et al. assigned to the assignee of the present invention. Kanevsky et al. teach protecting against fraudulent PIN or password use by probing the user for the intimate and dynamic knowledge, thereby making eavesdropping useless. However, this approach requires the institution to maintain an extensive data base of personal information about its clients and customers.

However, there still is a need for ways to input confidential data such as passwords in an open environment where the input may be observable by others while maintaining the security of the data being entered.

PURPOSES OF THE INVENTION

It is a purpose of this invention to improve remote transaction security;

It is another purpose of the invention to improve password security;

It is yet another purpose of the invention to maintain password and personal identification number security, regardless of where the password/PIN is provided by a client to a financial institution and in spite of the presence of multiple onlookers in close proximity.

SUMMARY OF THE INVENTION

The present invention is an apparatus, business method and program product for selectively providing access to a service facility such as a financial institution or bank. Client access codes (passwords, PINs) are maintained by the service facility in a database. When a client seeks access to the service facility, e.g., access to the client's account, a random sequence of character is generated and passed to the client. The client responds with an offset that when combined with the random character sequence is the client's access code. The client sends the code to the service facility and is granted access to the client's account. The client's response may be either by voice, by keypad or by another appropriate data input device to correct the random data to the user's password or PIN. Optionally, the service facility may specify an intended relationship between the offset and the random character sequence, e.g., the offset is added/subtracted from the random character sequence. For additional security, dummy characters may be embedded in the random character sequence. Clients do not directly communicate their individual access codes or passwords, but instead provide a correction of a sequence of symbols to which an eavesdropper does not have access. Thus, the client's access code remains secure from onlookers and eavesdroppers.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
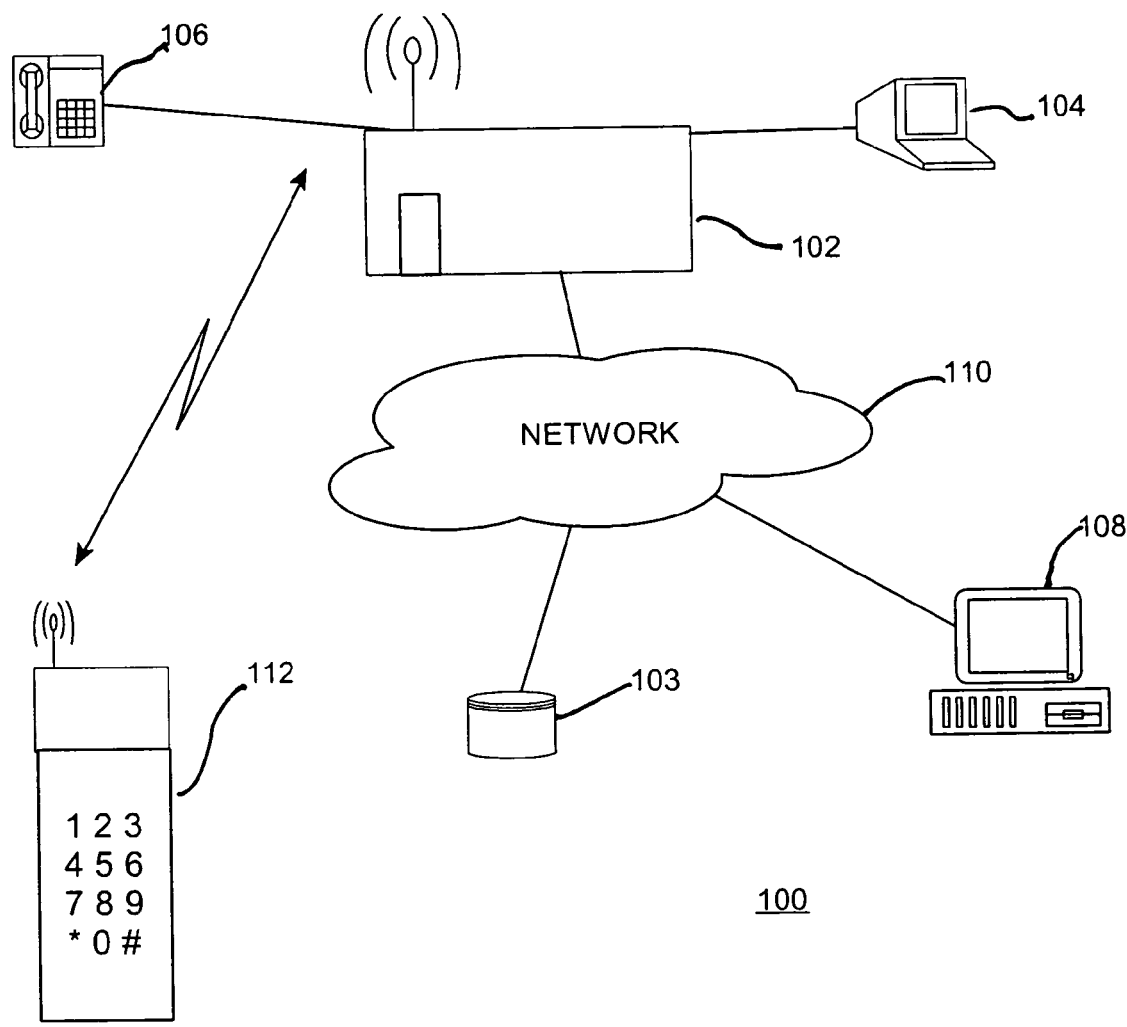
FIG. 1 is an example of the preferred embodiment system according to the present invention.

Turning now to the drawings and more particularly FIG. 1 is an example of the preferred embodiment system 100 for selectively providing access to a service facility 102 such as a financial institution or a bank according to the present invention. The financial institution 102 maintains financial data about clients. Typically, the financial data is contained in a database 103, normally, maintained on a server (not shown). In addition to conducting transactions in-person at the financial institution, financial transactions may be conducted, for example, at an Automated Teller Machine (ATM) 104, by telephone 106, by a remotely connected computer 108 connected over a network 110 (such as what is known as the "Internet"), using a cellular phone (cell phone) 112, or using any other appropriate means of communication. For convenience, the preferred embodiment is described herein in terms of application with cell phones 112 known as Wireless Application Protocol (WAP) phones; this is for example only and not intended as a limitation.

Typical state of the art WAP phones may include a smart card reader, as well as one or more (Subscriber Identification Module) SIM cards, one SIM card performing some type of computation and another carrying identification and public key encryption/signature capabilities. These WAP phones may used for secure transactions, such as stock trading, as well as for everyday purchases thereby replacing traditional credit cards or charge accounts. The financial service 102 or merchant assigns an unique identification number to a phone holder, e.g., a client or customer (not shown), which the customer uses for an encrypted password.

Unlike prior art approaches, wherein the client logs in to the financial institution and provides a unique PIN, in the preferred embodiment system the financial institution 102 provides a random number to which the client replies with an offset that the financial institution combines with the random number. The random number, when combined with the correct offset, is the client's password. Further, it is intended that for additional security, each offset digit is entered by a separate distinct set of entries, e.g., key taps on different individual keys.

Figure 2:
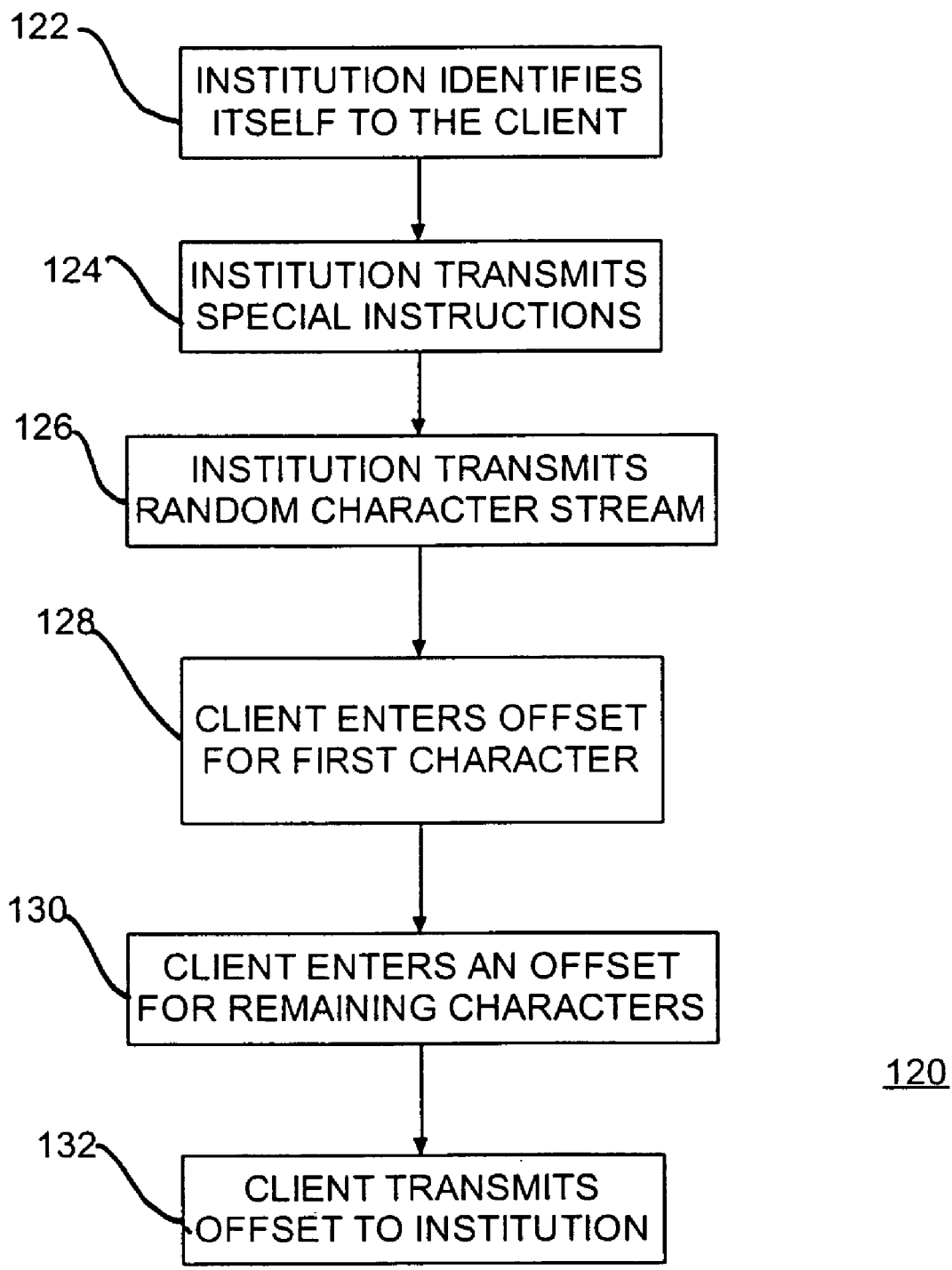
FIG. 2 is a flow diagram of the preferred secure authentication method for use by an account holder or client of a financial institution in conducting transactions from a selected input device according to the preferred embodiment of the present invention.

FIG. 2 is a flow diagram of the preferred secure authentication method for use by an account holder or client of a financial institution 102 in conducting transactions from a selected input device 104, 106, 108, 112 according to the preferred embodiment of the present invention. First in authentication step 122, to protect clients from an adverse unscrupulous party pretending to be the financial institution 102, when the client logs in the institution 102 identifies itself to the client. The level of authentication necessary depends upon the method of contact selected by the user. Thus, authentication of an ATM 104 may be automatic, especially if the ATM 104 is on the premises of the financial institution 102. Remotely located ATMs, e.g., at a grocer or another merchant, however, would require actual authentication to avoid false ATMs. Actual authentication would be necessary to ensure that the ATM is genuine, conforms to specifications of the institution(s) to which it is linked, and in particular, to prevent the merchant from accessing data that should not be accessible. Normally, this first authentication step 122 is done in the background, hidden from the rest of the operations. For example, all communications between the financial institution 102 and a WAP phone 112 can be performed using automatically transmitted cryptographic techniques with the financial institution providing previously stored client unique information, e.g., the name of the client's dog. Alternately, especially where large transactions merit more security, more complicated methods of verification may be used, requiring access to a computer 108 to conduct, e.g. a personal digital assistant (PDA) or wireless PDA.

Next in step 124, the financial institution 102 passes data to the user regarding what information will be required, such as the user's password, a code name of a stock, the number of shares to be transferred, etc. Again, depending upon the nature of the intended transfer, this step may be omitted. As with may repetitive operations, as the user becomes familiar with the particular type of transaction, the user may choose to skip this step 124. Next, in step 126, the financial institution sends a random data stream of at least as many alphanumeric characters as are actually included in the client's password or PIN and, the random character stream is presented to the client.

So, for a 4 digit PIN, at least four numerical digits are transmitted. Likewise, for a six letter password, a string of at least six characters are transmitted. Thus, how many and what type of alphanumeric characters are transmitted is dependent upon the password stored at the financial institution 102. Preferably, the random character stream is presented to the client as a display on a screen, e.g., a cell phone screen, rather than spoken. Such screens are easier to protect from onlookers than spoken numbers are from eavesdroppers. Current cell phone screens often are only visible from nearly direct frontal view, allowing the user to completely occlude the complete angle of screen visibility from onlookers.

Once the client receives the random character string, in step 128 the client uses keystroke entries to correct the first digit. Thus, depending upon the level of security desired, the response offset the first digit may simply be pushing the key corresponding to that offset, i.e., if the first transmitted digit is 3 and the first PIN digit is 7, then pressing the 4 key. In a more secure preferred embodiment, the client repetitively taps a predesignated button, e.g., the 1 button, the number of taps signifying an offset for the first digit. Alternatively, the offset may be entered using voice or another preselected button (e.g., as sent in the message in step 124), to combine with the first character of the random data stream thereby transforming it to the actual first character of the client's password or PIN.

In step 130 the client proceeds to the next character, optionally, using other corresponding buttons to enter the offset for password or PIN characters to which they correspond. As noted above, more characters may be transmitted than what are needed for the particular password or PIN. Extra characters, if sent, may be grouped at the beginning of, the end of, or interspersed in the random data stream. For example, the data stream may include extra or dummy characters at alternating positions or at every third position. Finally, in step 132, after having entered offsets for the password/PIN for each corresponding character of the random data stream, the offsets are transmitted to the financial institution 102.

For example, in step 122, the financial institution identifies itself to the client using cryptographic methods well know in the art of secure communications. Special instructions, such as indicating that the difference is to be used, are transmitted in step 124. Then, for a four character (alphanumeric character) password/PIN, in step 126 the financial institution sends a random alphanumeric data stream of at least 4 characters. In step 128 the client may use the key or button labeled "1" on the communication device e.g., a WAP phone, pushing that key the number of times corresponding to the offset to correct the first character. In step 130, the client uses buttons 2, 3 and 4 to correct the other corresponding characters. If the password is longer and includes letters, each letter may be offset the same way, for example, using buttons labeled 5, 6, 7, 8 and 9 wherein pushing once advances each corresponding letter once with z being advanced to a. Once the offset is entered for each character, the offsets are transmitted in step 132, e.g., pressing a "send" button.

So, with the special instructions being "difference," if the client's password is 1233 and the random sequence is 2571, after keying the corresponding keys the client may transmit a number that results from tapping the corresponding keys 1, 2, 3 and 4. In this example that resulting number is 1222333344. Other special instructions may include modulo add, modulo subtract, advance or, whether a chosen attack password is being used for protection to prevent an aggressor from forcing the client to perform a transaction. As noted above, voice can be used instead of buttons. For such an application, the client, speaking into a phone might say "add 3 to first digit, add 7 to third digit" and so on, instead of keying in information. Also, handwritten responses may be substituted with appropriate handwriting recognition software. In yet another embodiment, the client may use navigation buttons to rearrange objects presented on a display.

However, whichever entry method is used, an onlooker or eavesdropper would not gain any significant information by eavesdropping. At worst an onlooker might observe an upper bound on the number of digits in the PIN. To insure against such an observation, as noted above, extra dummy characters may be included with the random character stream. Thus, even if the client's phone or a SIM card is stolen, the knowledge of how the characters are transformed would be useless to the thief because, in the next transaction another random string is sent that also must be transformed to the actual password/PIN. Further, it should be noted that although the above description is in terms of password protection, the present invention may be adapted to protect other types of data or information such as, the name of a stock, or the number of shares the client desires to trade, or a plane ticket the client is purchasing.

As can be seen from the above, the present invention has several advantages over the prior art. Unlike the relatively unshielded keypad of an openly placed ATM or telephone, the display screen of an ATM or WAP phone can more easily be shielded from third parties. Further, even in public places, a WAP phone can easily be shielded from onlookers, e.g., by entering the stall of a public rest room. Also, since the random code is transmitted to the client, it is harder for an onlooker or eavesdropper to capture both the random character stream as it is received and the offset, especially if the random character stream is provided to the client as spoken words on a cell phone or on the screen of a WAP phone.

Optionally, when the entry terminal is a WAP phone 1112, progression instructions and random prompts may be included in the random character stream and automatically generated for the client by a smart card embedded in the device being used. If this option is included, the progression instructions and random prompts must be destroyed after use, and memory locations where they were stored must be wiped clean to avoid subsequent unauthorized use by a cell phone thief. This optional embodiment uses transmission time more efficiently and has less exposure to communication breakdowns.

Yet another embodiment is directed to state of the art systems wherein random passwords are generated by small machines which the server recognizes as corresponding to the time of use by a particular user. However, when used with a portable machine such as a WAP phone, if a thief steals both the WAP phone and the password tool, the thief has access to the system. Including type of password or PIN portion in such a security system, wherein authentication of that portion is as described herein improves the system's security such that even a thief with the WAP and the password tool is denied access.

Additionally, as can be seen, unlike prior art authentication methods, the method of the preferred embodiment would require less equipment for a merchant or financial institution. Also, dishonest merchants would be prevented from making additional, illegitimate withdrawals from a customer's card. Smart phones are expected to proliferate, growing much faster than the projected increase of regular credit cards users, using these new smart phones as credit cards will become necessary for credit card companies to avoid being disintermediated, seeing their businesses taken away by providers of such new technologies.

While the invention has been described in terms of preferred embodiments, those skilled in the art will recognize that the invention can be practiced with modification within the spirit and scope of the appended claims.

We claim:

1. An apparatus for selectively providing access to a service facility, said apparatus comprising:
    a database containing client access codes;
    a random character generator generating a random sequence of characters responsive to a request for access by a client;
    means for sending service facility identification to said requesting client;
    means for communicating said generated random character sequence to said requesting client;
    means for receiving an offset from said requesting client; and
    means for combining said offset with said random character sequence, wherein a correct offset combines with said random character sequence to provide said requesting client's access code.

2. An apparatus for selectively providing access to a service facility as in claim 1, wherein when said requesting client provides said correct offset, said requesting client is given access to said service facility.

3. An apparatus for selectively providing access to a service facility as in claim 2 further comprising:
    means for identifying the service facility to requesting clients.

4. An apparatus for selectively providing access to a service facility as in claim 3, further comprising:
    wireless communication means for communicating with requesting users, said apparatus being capable of sending generated random character sequences and receiving corresponding offsets using said wireless communication means.

5. An apparatus for selectively providing access to a service facility as in claim 3, wherein the offset provided by said requesting client is a series of numbers corresponding to key taps on a key pad.

6. An apparatus for selectively providing access to a service facility as in claim 3, wherein the offset provided by said requesting client comprises object locations on a displayed image.

7. An apparatus for selectively providing access to a service facility as in claim 3, wherein requesting users communicate over a network from a remotely connected computer, said apparatus sending generated random character sequences and receiving corresponding offsets over said network to and from said remotely connected computer.

8. A business method of selectively providing access to a service facility, said business method comprising the steps of:
   a) receiving a request for access by a client;
   b) sending service facility identification to said requesting client;
   c) generating a random character string and providing said random character string to said requesting client;
   d) receiving an offset from said client;
   e) combining said offset with said random character string to generate an access code; and
   f) comparing said generated access code against a stored client access code corresponding to said requesting client, access being granted when said generated access code and said stored client access code are identical.

9. A business method of selectively providing access to a service facility as in claim 8, after the step (a) of receiving the request for access, said business method further comprising the step of:
   a1) sending correction operation information to said requesting client.

10. A business method of selectively providing access to a service facility as in claim 8, wherein the step (c) of receiving the offset includes receiving a series of keypad entries, each said keypad entry representing an offset of one in a corresponding character of said random character string.

11. A business method of selectively providing access to a service facility as in claim 8, wherein the step (c) of receiving the offset includes receiving a spoken offset value, said spoken offset value being converted to a series of offset characters.

12. A business method of selectively providing access to a service facility as in claim 8, wherein the step (c) of receiving the offset includes receiving a handwritten offset value, said handwritten offset value being converted to a series of offset characters.

13. A business method of selectively providing access to a service facility as in claim 8, wherein the step (c) of receiving the offset includes manipulating objects in a display, said objects being placed randomly responsive to said random character string, said object manipulation corresponding to said offsets.

14. A computer program product for selectively providing access to a service facility, said computer program product comprising a computer usable medium having computer readable program code thereon, said computer readable program code comprising:
   computer readable program code means for receiving a request for access by a client;
   computer readable program code means for sending service facility identification to said requesting client;
   computer readable program code means for generating a random character string and providing said random character string to said requesting client;
   computer readable program code means for receiving an offset from said client;
   computer readable program code means for combining said offset with said random character string to generate an access code; and
   computer readable program code means for comparing said generated access code against a stored client access code corresponding to said requesting client, access being granted when said generated access code and said stored client access code are identical.

15. A computer readable program code means for selectively providing access to a service facility as in claim 14, further comprising:
   computer readable program code means for sending correction operation information to said requesting client.

16. A computer readable program code means for selectively providing access to a service facility as in claim 14, wherein the computer readable program code means for receiving the offset includes computer readable program code means for receiving a series of keypad entries, each said keypad entry representing an offset of one in a corresponding character of said random character string.

17. A computer readable program code means for selectively providing access to a service facility as in claim 14, wherein the computer readable program code means for receiving the offset includes computer readable program code means for receiving a spoken offset value, said spoken offset value being converted to a series of offset characters.

18. A computer readable program code means for selectively providing access to a service facility as in claim 14, wherein the computer readable program code means for receiving the offset includes computer readable program code means for receiving a handwritten offset value, said handwritten offset value being converted to a series of offset characters.

19. A computer readable program code means for selectively providing access to a service facility as in claim 14, wherein the computer readable program code means for receiving the offset includes computer readable program code means for receiving object manipulation on a display, said objects being placed randomly responsive to said random character string, said object manipulation corresponding to said offsets.

* * * * *